Figure 3:
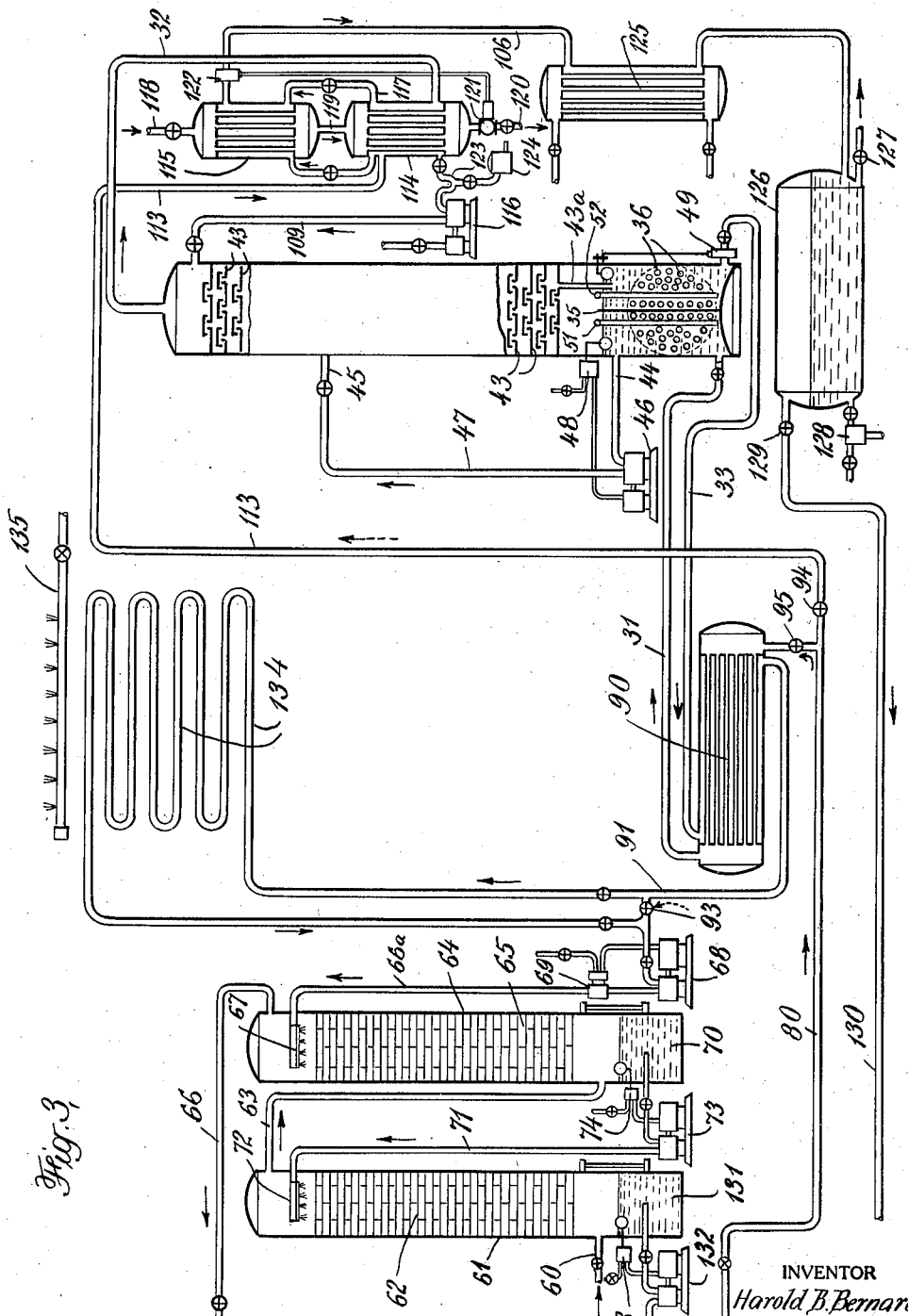

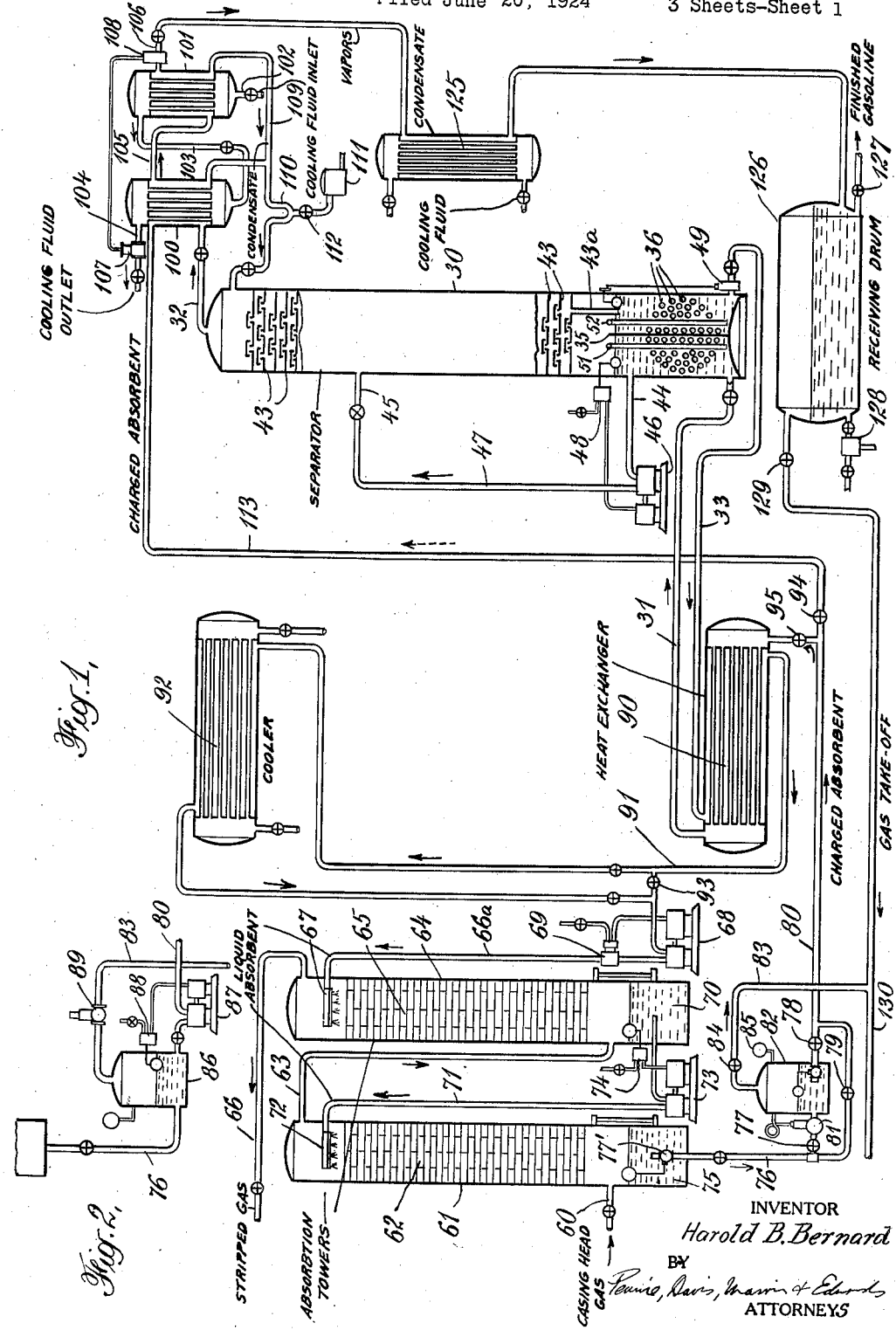

May 11, 1926.

H. B. BERNARD 1,584,504

GASOLINE RECOVERY APPARATUS

Filed June 20, 1924 3 Sheets-Sheet 2

INVENTOR
Harold B. Bernard

Pennie, Davis, Marvin & Edmonds
ATTORNEYS

May 11, 1926.
H. B. BERNARD
1,584,504
GASOLINE RECOVERY APPARATUS
Filed June 20, 1924   3 Sheets-Sheet 3
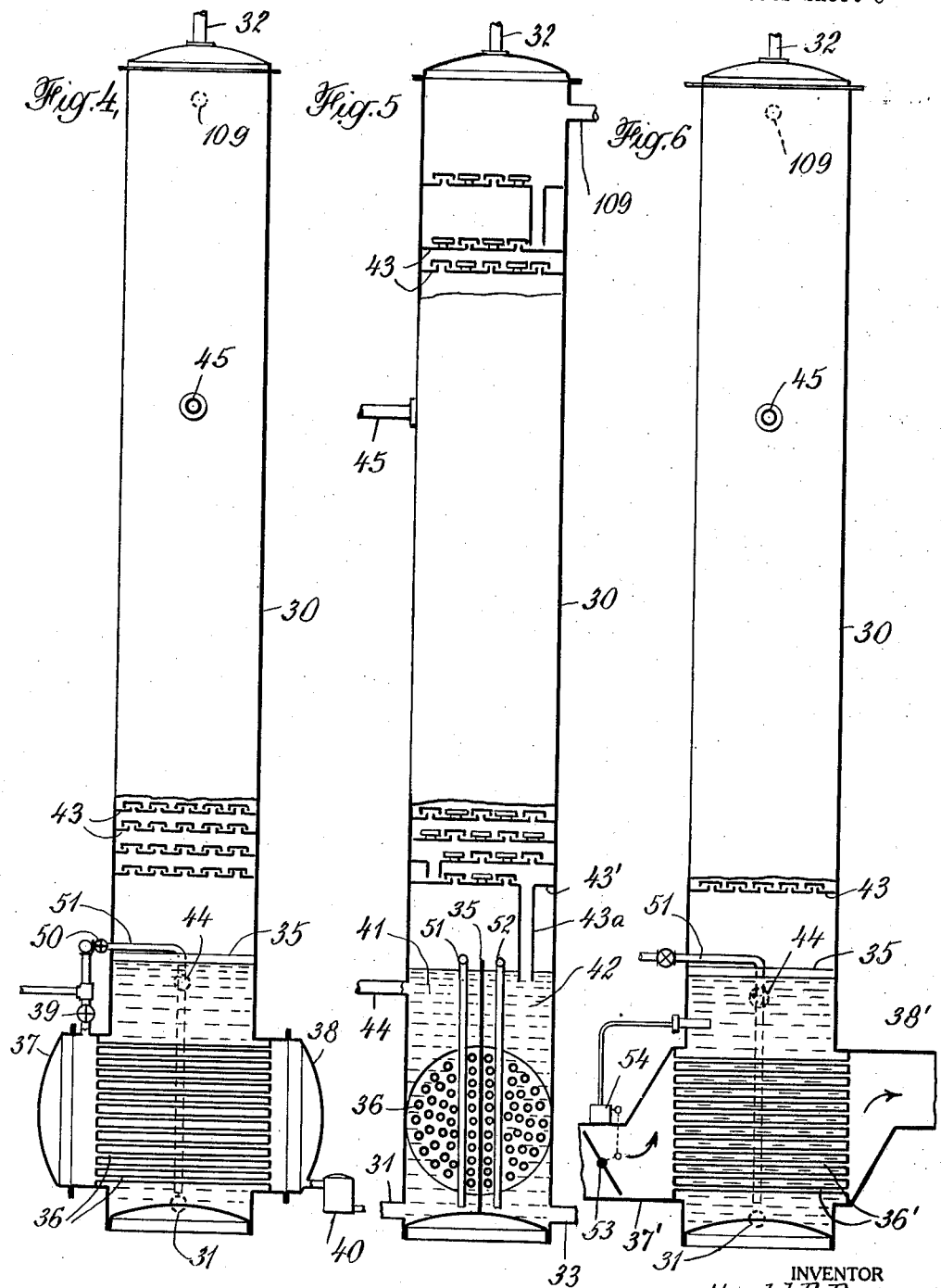
INVENTOR
Harold B. Bernard
BY
Pennie, Davis, Marvin & Edmonds
ATTORNEYS Patented May 11, 1926.

1,584,504

UNITED STATES PATENT OFFICE.

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE.

GASOLINE-RECOVERY APPARATUS.

Application filed June 20, 1924. Serial No. 721,164.

This invention relates to the recovery from natural gas and casinghead gas of liquid mixtures of hydro-carbons of the type commonly known as natural gas gasoline, natural gasoline, and casinghead gasoline. These liquid hydrocarbon mixtures are of a light gasoline character and are particularly adapted for use in blended motor fuels in admixture with heavier hydrocarbons. One of the objects of the invention is the provision of an improved apparatus for the recovery of such hydrocarbons.

More particularly, this invention relates to an improved apparatus for use in the recovery of natural gas gasoline and the like by absorption in a liquid absorbing medium, and to an improved apparatus for separating the absorbed vapors from the liquid absorbent; and the invention particularly includes improvements in the apparatus for separating the absorbed gasoline from the absorbing medium.

Briefly, in recovering natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected.

In a copending application filed May 27, 1924, Serial No. 716,129, there is described an improved method and apparatus in which the liquid absorbent charged with absorbed gasoline, following the absorption treatment, is subjected to a preliminary distillation treatment, and the liquid from the preliminary distillation treatment while hot is then passed in countercurrent flow and in direct contact with the hot gases and vapors separated in the preliminary distillation treatment; and in which supplementary gas may be employed in either the distillation treatment or the following treatment.

The present invention, in one aspect, relates to a modified form of the apparatus described in said application and is adapted for use in practicing the process of said application.

In one embodiment, the apparatus of the present invention may comprise a vertical tower having its lower end divided into two separate compartments with means for heating either or both of the compartments, the tower above these compartments being arranged to promote intimate contact and heat transfer between downflowing liquid and upflowing vapors and gases and to discharge the downflowing liquid into one of the compartments, and means for withdrawing liquid from the other compartment and discharging it into the upper part of the tower, both compartments being arranged to permit free passage of vapors and gases liberated in the compartments to and through the tower above the compartments.

In the apparatus of the present invention, the charge absorbent is supplied to the compartment from which liquid is circulated to the upper part of the tower and the denuded absorbent is withdrawn from the other compartment. The charged absorbent is heated in the supply compartment and all or a part of the absorbed constituents, including light vapors and gases as well as absorbed gasoline constituents, are vaporized, the liberated vapors and gases passing upwardly through the tower. The separated liquid absorbent together with any remaining absorbed constituents, is withdrawn and circulated downwardly through the towers to the other compartment. The tower, between the point of liquid introduction and the lowermost point at which the upwardly flowing vapors and gases contact with the downwardly flowing liquid, thus acts as an exhausting receptacle, for removing any remaining gasoline constituents absorbed in the liquid menstruum and assisting in removing any entrained or vaporized absorbent from the separated gases and vapors. Heat may also be applied to the discharge compartment to assist in the separation of the absorbed constituents, any vapors and gases liberated in the discharge compartment being passed upwardly through the tower with the vapors and gases from the supply compartment. Additional light gas may also be introduced, into the supply compartment, the discharge compartment, or into the exhausting section of the tower to assist in the separation of the absorbed gasoline constituents.

The heating means may comprise heating coils or flues below the liquid level in the compartments through which steam or other heating gases are passed. Automatic means for regulating the heating may also be provided, as well as automatic means for maintaining the levels in the compartments. Heat may also be applied by the direct introduction of steam or hot gas, such as stripped gas from the absorber which has been heated, through perforated pipes or other suitable means into the liquid in the compartments. Light gas for assisting in vaporizing the absorbed gasoline constituents may be similarly introduced, or may be introduced into the exhausting section of the tower. Such light gas may also be introduced hot to heat or to assist in heating the apparatus.

The exhausting section of the tower may be of conventional bubble tower or baffle tower construction or may be of the helical construction of the type described in the application of John E. Bell filed April 1, 1924, Serial No. 703,338, or of other tower construction of similar function adapted to promote intimate contact and heat exchange between downflowing liquid and upflowing vapors and gases.

The invention will be further described in connection with the accompanying drawings illustrating several embodiments of the apparatus of the invention; but it is intended and will be understood that this further description and illustration is to be construed as exemplifying the invention and not in a limiting sense.

In the accompanying drawings:

Fig. 1 diagrammatically represents in elevation and partly in section a system for gasoline recovery embodying the apparatus of the invention, Fig. 2 is a modified form of one of the elements of the system illustrated in Fig. 1, Fig. 3 diagrammatically represents in elevation and partly in section a somewhat modified system for gasoline recovery embodying the apparatus of the invention, Fig. 4 diagrammatically represents in elevation and partly in section one form of the exhausting apparatus of the invention, Fig. 5 is a view of the apparatus illustrated in Fig. 4 at right angles to the view shown in Fig. 4, and Fig. 6 is a somewhat modified form of the apparatus illustrated in Fig. 4.

Figs. 1 and 3 diagrammatically illustrate a complete system for recovering gasoline from natural gas or casinghead gas. In operating a gasoline recovery system of the type illustrated, the natural gas or casinghead gas containing the gasoline to be absorbed is passed through absorbing towers wherein it is contacted with the cooled liquid absorbent, the charged absorbent is passed through a heat exchanger to an exhausting apparatus in which the gasoline is removed from the liquid absorbent, the denuded absorbent is circulated through the heat exchanger giving up a part of its heat to the charged absorbent entering the exhausting apparatus and after further cooling, if necessary, is returned to the absorbers, the vapors and gases separated from the absorbent in the exhausting apparatus are passed through a rectifier and thence through one or more dephlegmators, any dephlegmate is returned to the rectifier and exhausting apparatus, and the final gasoline fraction escaping from the dephlegmators as a vapor is condensed and collected.

Referring to Fig. 1, the natural gas or casing head gas containing the gasoline vapors is introduced through connection 60 into the lower part of the first absorbing tower 61, passed upwardly through baffles or filling material 62, conducted from the top of the first tower to the lower part of the second absorbing tower 64 through connection 63 and passed upwardly through baffles or filling material 65 therein, and the stripped gas is exhausted from the upper end of the second tower through connection 66. The fresh liquid absorbing medium is introduced into the top of the second absorbing tower through connection 66ª and sprayhead 67 by means of pump 68. A governor 69 is provided actuated by a flow-rate mechanism in the connection 66ª for controlling the operation of the pump 68 so as to maintain a constant rate of flow of the liquid absorbing medium. In the absorbing tower 64, the liquid absorbent is distributed over the filling material through the sprayhead and is passed downwardly in direct contact and in countercurrent flow with the ascending partially stripped gas from the first absorbing tower. The partially charged absorbent collects in the liquid reservoir 70 in the lower part of the tower 64 and is introduced into the top of the first tower through connection 71 and sprayhead 72 by means of pump 73. A float actuated governor 74 is provided for controlling the operation of the pump 73 to maintain the liquid level in the reservoir 70, above the outlet connection to the pump 73 and below the gas inlet of connection 63. In the tower 61 the partially charged absorbent is passed downwardly in countercurrent flow and in direct contact with the ascending fresh gas. The charged absorbent collects in the liquid reservoir 75 in the lower part of the tower 61. From the reservoir 75 the charged absorbent is discharged through connection 76 in which a float actuated valve 77′ is interposed for maintaining the liquid level in the reservoir below the gas inlet and above the liquid outlet.

Where the pressure prevailing in the absorbing towers is sufficient to force the charged absorbent through the heat exchanger 90 into the exhausting apparatus, the valves 77 and 78 can be closed and the valve 79 opened, the charged absorbent being discharged directly from the liquid reservoir 75 through connection 80. Where a high pressure prevails in the absorbers the valve 79 can be closed and the valves 77 and 78 can be opened and the charged absorbent passed through the reducing valve 81 and the vent tank 82 where the pressure is reduced to the desired value and the liquid absorbent discharged through connection 80, any separated gases and vapors being withdrawn through connection 83, the withdrawal being regulated by means of valve 84. The vent tank may be provided with a level gauge to assist in regulating the withdrawal of vapors and gases and a pressure gauge 85 to assist in regulating the pressure reduction.

In place of the arrangement of the vent tank and the expansion valve illustrated in Fig. 1 the arrangement of vent tank and expansion valve illustrated in Fig. 2 may be substituted. Referring to Fig. 2, the charged absorbent from the reservoir 75 is discharged directly into the vent tank 86 through connection 76. The charged absorbent is withdrawn from the vent tank by means of a pump 87, which acts as a reducing valve, and which is controlled by a float actuated governor 88. An expansion valve 89 in the vent connection 83 serves to reduce the pressure upon any vapors and gases liberated within the vent tank 86.

Where a vent tank is employed, as in Fig. 1 or to a lesser extent as in Fig. 2, some of the lightest vapors and gases are liberated from the absorbent upon the reduction of pressure. In practicing the present invention, the light vapors and gases, other than the absorbed gasoline constituents, are employed in effecting the separation of the absorbed gasoline constituents from the liquid absorbent, and except where the absorption treatment is effected under very high pressure and a relatively large proportion of incondensible gases are absorbed, it is generally desirable to conduct all of the gases and vapors absorbed in the absorption treatment through the distillation treatment and the exhausting treatment. Direct valve control of the pressure reduction, where a higher pressure is employed in the absorbers than prevails in the distillation and exhausting treatments, is usually desirable and satisfactory.

The heat exchanger 90 is of the shell and tube type. The charged absorbent passing to the still through connection 80 is circulated through the tubes. The denuded absorbent from the exhausting apparatus is circulated about the tubes and is discharged through connection 91. The denuded absorbent escaping from the heat exchanger 90 is circulated through the cooler 92 on its way to the pump 68. Where the cooling effected in the heat exchanger 90 is sufficient or where it is desirable to limit the degree of extraction effected in the absorbers, as to prevent or reduce the extraction of the lighter vapors and gases, all or a part of the absorbent leaving the heat exchanger 90 may be by-passed around the cooler 92 through valved connection 93. From the heat exchanger 90 the charged absorbent is introduced into the exhausting apparatus through connection 31.

In the exhausting apparatus 30 a separation of the absorbed vapors and gases and the liquid absorbing mediums is effected. The separated vapors and gases are discharged through connection 32 and the denuded absorbent is returned to the absorbers through the heat exchanger 90 through connection 33. The present invention relates more particularly to this exhausting apparatus, and the construction and operation of the exhausting apparatus illustrated will be described more in detail following the description of the entire system.

The dephlegmators, 100 and 101, of the shell and tube type are shown in Fig. 1, connected in series with respect to both the cooling fluid and the vapors and gases undergoing dephlegmation, but one or a greater number of dephlegmators of this or other construction may be employed. The cooling fluid enters the second dephlegmator 101 through connection 102, passes through the tubes therein to the first dephlegmator 100 through connection 103, and escapes therefrom through connection 104. The vapors and gases enter the first dephlegmator through connection 32, pass about the tubes therein to the second dephlegmator through connection 105, and escape from the second dephlegmator through connection 106. A thermostatically operated valve 107 is provided in the cooling fluid outlet 104 actuated by the thermostat 108 in the vapor outlet 106 for controlling the cooling and condensation within the dephlegmators. From the dephlegmators any condensate is returned to the upper part of the rectifying section of the exhausting apparatus through connection 109 having a liquid seal trap 110 therein. A trap 111 is connected to the lowest point of the seal 110 for removing any water condensed in the dephlegmators where direct steam is employed in the exhausting apparatus. Where the removal of water at this point is not desired, the valve 112 is closed disconnecting the trap. The returned reflux assists in the rectification, and the character of the final product can, within limits, be controlled by regulation of the character and quantity of reflux. The character and quantity of reflux from the dephlegmators can be controlled by regulation of the temperature and amount of cooling fluid circulated therethrough.

The dephlegmation in the dephlegmators 100 and 101 can also be controlled and in part effected by the introduction into the dephlegmators of a regulated amount of gasoline charged absorbent. A connection 113 is shown for by-passing a part of the gasoline charged absorbent from the absorbers 61 and 64 from connection 80 into the first dephlegmator 100. Regulation of the amount of gasoline charged menstruum so introduced into the first dephlegmator is effected by adjustment of valves 94 and 95. The absorbent and any unvaporized part of the absorbed constituents, after passing through the dephlegmator, is returned to the exhausting apparatus with the reflux, and in passing through the tower is stripped of any remaining absorbed gasoline. This stripped absorbent is also returned to the absorbers.

The vapors escaping through the connection 106 pass through the condenser 125, shown of the shell and tube type, and the condensate is collected in the receiving drum 126. The finished gasoline product is withdrawn through the valved outlets 127; or where direct steam is employed and the condensate in the drum 126 includes some water, the gasoline product may be withdrawn through the separating trap 128. Any vapors and gases collecting in the receiver are withdrawn through the valved outlet 129, escaping through connection 130.

The apparatus illustrated in Fig. 3 is in several respects sufficiently similar to that shown and described in Fig. 1 so that a separate description is unnecessary with respect to these corresponding features.

As in Fig. 1, the natural gas or casinghead gas enters the first absorbing tower through connection 60 and the stripped gas leaves the second absorbing tower through connection 66. Excepting the means for removing the charged absorbent from the first tower, the operation and construction of these towers and the absorbent circulating pumps are the same as has been described in connection with Fig. 1.

The construction illustrated in Fig. 3 is particularly adapted for carrying out the absorption under relatively low pressure, including pressures lower than the pressure in the exhausting apparatus. The gasoline charged absorbent collects in the reservoir 131 in the lower part of the first tower 61 and is withdrawn therefrom by means of pump 132. A float actuated governor 133 is provided for controlling the operation of the pump 132 to maintain the liquid level in the reservoir 131 above the outlet connection to the pump 132 and below the gas inlet of connection 60. The pump 132 forces the gasoline charged menstruum through the heat exchanger 90 into the exhausting apparatus.

In place of a cooler of the shell and the tube type, as illustrated at 92 in Fig. 1, an atmospheric cooling coil 134 over which water or other cooling fluid is distributed from perforated pipe 135 is provided for cooling the returned denuded absorbing medium. An atmospheric cooler is of advantage where cooling water of satisfactory quality for use in a shell and the tube type cooler is not readily available or where it is desirable to supplement the cooling action of the sensible heat of the cooling water by the heat of evaporation of part of the water. Likewise, an atmospheric cooler or condenser may be used in place of or as a supplementary cooler in connection with the condenser 125.

In the apparatus illustrated in Fig. 1, the dephlegmators 100 and 101 are arranged to provide for return of the dephlegmate to the exhausting apparatus by gravity. In the apparatus illustrated in Fig. 3, the dephlegmate is returned to the exhausting apparatus by means of a pump 116. The vapors and gases from the exhausting apparatus enter the first dephlegmator 114 through connection 32, pass about the tubes therein to the second dephlegmator 115 through connection 117, and escape from the second dephlegmator through connection 106. The cooling fluid enters the second dephlegmator through connection 118, passes through the tubes therein to the first dephlegmator through connection 119, and escapes therefrom through connection 120, flowing through the dephlegmators in countercurrent to the flow of vapors and gases. A thermostatically operated valve 121, in the cooling fluid outlet 120 and actuated by the thermostat 122 in the vapor outlet 106, is provided for controlling the cooling and condensation within the dephlegmators. The dephlegmate collecting in the lower part of the space about the tubes in the lower dephlegmator 114 is withdrawn through connection 123 and forced into the upper part of the exhausting apparatus through connection 109 by means of pump 116. A trap 124, connected to the connection 123 through a valve, is provided for removing any water condensed in the dephlegmators where direct steam is employed in the exhausting apparatus. Valve controlled connection 113 is provided for introducing gasoline charged absorbent into the lower dephlegmator, the menstruum and any unvaporized absorbed constituents of any absorbent so introduced being returned to the exhausting apparatus by means of pump 116 with the dephlegmate.

The exhausting apparatus, illustrated in Figs. 1, 3, 4 and 5, comprises a closed vertical tower 30. A partition 35 is arranged in the base of the tower dividing it into two separate compartments 41 and 42, each opening upwardly into the tower. By arranging the heating tubes as illustrated, an imperforate partition may be employed, rendering it easy to make the compartments tight and avoiding passage of the heating pipes through the partition, and at the same time access to the tubes for cleaning, repair or replacement is facilitated. The opposite headers 37 and 38 may be divided by a vertical partition arranged in a position corresponding to the partition 35 to permit separate control of the heating in the compartments. A valved steam connection 39 is provided for the introduction of steam into the heating tubes 36. This valve may be thermostatically controlled, or the outlet of the heating tubes may be connected to a steam trap 40 and the temperature controlled by regulation of the steam pressure in the heater, condensate being withdrawn through the trap.

A connection 31 is provided for introducing the charged liquid absorbent into the supply compartment 41, and a connection 33 is provided for withdrawing denuded absorbent from the discharge compartment 42.

A series of bubble plates 43, individually of conventional construction, are arranged in the tower above the top of the partition 35. The lowermost bubble plate 43' is arranged and provided with a connection 43ª for returning the liquid reaching the last bubble plate to the discharge compartment 42. A connection 44 is arranged for withdrawing unvaporized liquid from the supply compartment 41, and a connection 45 is provided for introducing the withdrawn liquid into the upper part of the tower.

A pump 46 may be provided, as illustrated in Figs. 1 and 3, in the connection 47 between the outlet 44 and the inlet 45 for circulating the liquid absorbent and any remaining absorbed constituents from the supply compartment 41 to the upper part of the tower. The circulating pump 46 may be provided with a float actuated governor 48 for controlling the liquid level in the supply compartment and maintaining it below the top of the partition and above the outlet 44. A float actuated valve 49 may also be provided in the outlet 33 from the discharge compartment for regulating the liquid level therein and maintaining it below the top of the partition and above the lower end of the connection 43ª. By providing such level controlling means, particularly where thermostatic temperature control is employed, the normal operation of the exhausting apparatus becomes largely automatic. External fluctuations, of sufficient magnitude, may temporarily upset the operating balance in the exhausting apparatus and liquid may be discharged across the partition in either direction. The apparatus of the invention thus provides for the absorption of such fluctuations without interruption and with a minimum of interference with the complete operating cycle.

In the apparatus illustrated, the liquid inlet 45 is arranged somewhat below the top of the tower and a series of bubble plates are also provided in the tower above this inlet. The vapors and gases separated in the tower escape through connection 32, and connection 109 is provided for the introduction of returned dephlegmate, or other liquid, to the top of the tower. In Fig. 5, the top bubble plate and the next to the lowermost bubble plates are shown as provided with connections to promote draining of liquid to the plate below for facilitating the final separation of gases, vapors and liquids at the top and bottom of the liquid-vapor-gas contact section of the tower.

The entire tower structure and the external liquid circulating connections (e. g. connections 44, 47 and 45 and the oil end of the pump 46) are thoroughly heat insulated or lagged to prevent or minimize heat loss.

Connections 51 and 52 are provided for introducing steam or gas into the liquid in the compartments 41 and 42 respectively. In Fig. 4 these connections are shown as connected to the steam header for supplying steam to the heater in the base of the tower through separate control valves 50. In the drawings, these pipes are shown as arranged for the introduction of steam or gas into the lower part of the supply and discharge compartments and the steam or gas discharged therethrough bubbles up through the liquid in the compartments. Connections may also be arranged for introducing steam or gas above the liquid levels in the compartments.

In Fig. 6 a modified structure adapted for using heating gases, such as furnace gases or waste flue gases, is diagrammatically illustrated. The apparatus is sufficiently similar to that described in connection with Figs. 4 and 5 so that a description of the heater will suffice. A series of heating flues 36' are arranged in the supply and discharge compartments between flue connections 37' and 38' on opposite sides of the base of the tower. A damper or valve 53 is arranged in the inlet flue connection 37' for controlling the flow of the heating gases. A thermostatically actuated control 54 may be provided for automatically regulating the temperature in the compartments.

By way of further illustration, the exhausting apparatus of the type shown in Figs. 4 and 5 may comprise a tower 38 feet high and 5 feet in diameter. The partition may extend 8 feet above the bottom. The heater may comprise 1380 1 inch tubes 6 feet long arranged between headers at opposite ends of a transverse still 5 feet in diameter having its center 4 feet above the bottom of the tower. These tubes may be divided evenly between the supply and discharge compartments, or a greater number may be arranged in the supply compartment. A series of 30 bubble plates may be arranged 9 inches apart beginning 12 feet above the bottom of the tower. Each of these plates may have 17 bubble caps 8 inches in diameter arranged over nozzles 6 inches in diameter adapted to maintain a liquid depth on the plates of about 2 inches. The discharge inlet for the liquid withdrawn from the supply compartment may be arranged between the 10th and 11th plates from the top of the tower.

In treating natural gas or casing head gas with a cool liquid absorbent, a part of the very light constituents of the gas, incondensible at ordinary temperatures and pressures, are absorbed together with the gasoline vapors in the liquid absorbent. These light incondensible constituents may be absorbed in amount even as great or greater than the gasoline constituents. When the charged absorbent is heated to a temperature sufficient to vaporize the absorbed gasoline constituents, these light constituents are likewise set free. In general, the light constituents are retained by the absorbent less strongly than the heavier constituents, so that the tendency, particularly at lower temperatures, is toward a greater relative separation of the lighter constituents, if the stripping is not pushed to completion. The amount of light incondensible gases may be very much increased where the absorption is carried out under higher pressures, and in this case, a large part of the absorbed gases may be set free upon the reduction of pressure before any application of heat. According to the present invention, these absorbed gases are employed to assist in effecting an improved separation of the absorbed gasoline constituents from the absorbing medium.

In the exhausting apparatus of the present invention, an initial separation of the absorbed constituents and the absorbing medium is effected in the supply compartment. The separated vapors and gases from the supply compartment may include entrained or partially vaporized absorbent in small amounts, and the liquid withdrawn from the supply compartment may include unvaporized quantities of the absorbed gasoline constituents. The hot liquid from the supply compartment is then introduced into the upper part of the tower and passed in counter current flow and in direct contact with the hot vapors and gases rising through the tower. At the relatively high temperature prevailing in the exhausting apparatus, the absorbing capacity for gasoline constituents of the lightest vapors and gases initially separated is relatively high and the liquid absorbent tends to give up any remaining absorbed gasoline constituents. At the relatively high temperature, the absorbed gases, and absorbed vapors lighter than the desired gasoline constituents, are thus employed as an absorbent for recovering any remaining absorbed gasoline constituents from the liquid absorbent. The contacting effected in the exhausting apparatus also assists in removing any vaporized or entrained liquid absorbent. The concentration, and the partial pressure effect, of the gases and vapors lighter than the gasoline constituents may also be increased by introducing into the exhausting apparatus additional quantities of light gas, such as stripped gas from the absorbers. Heat may also be supplied by introducing this gas in a heated condition. Where incondensible gases are so employed, the quantity of gas used is relatively small with reference to the total amount of gas subjected to the absorbing treatment, so that even though the vaporized gasoline constituents are thereby somewhat diluted, a relatively high concentration of the gasoline constituents is effected.

The gases and vapors separated from the liquid absorbent in the exhausting apparatus may be subjected to rectification in the upper part of the tower for further removal of any vaporized or entrained liquid absorbent. Before final condensation, the rectified vapors may also be subjected to dephlegmation and the dephlegmate returned to the exhausting apparatus. Dephlegmation may be controlled and in part effected by the direct introduction into the vapors and gases undergoing dephlegmation of a regulated part of the gasoline-charged liquid absorbent. The heat exchange in the dephlegmation tends to vaporize the absorbed gasoline, and where the dephlegmate, in this case including the absorbing menstruum, is returned to the exhausting apparatus, the further removal of any retained gasoline constituents is effected in the exhausting apparatus.

Sufficient pressure may be maintained in the exhausting apparatus for circulating the vapors and gases through the rest of the system to the receiver. The pressure maintained depends, in part, upon the pressure maintained in the receiver, and where a relatively high pressure is employed in the receiver, the pressure in the exhausting apparatus may be maintained substantially in excess of atmospheric pressure.

To assist in regulation of the operation of the apparatus, a thermometer or other temperature indicating device can be arranged in the inlets and outlets to the supply and discharge compartments, in the connection for introducing liquid from the supply compartment into the upper part of the tower, in the gas and vapor outlet, and in the dephlegmate return line, if employed.

The apparatus of the present invention is particularly adapted for use in carrying out the process described in the hereinbefore referred to application of Harold B. Bernard, and, in operation, enables the attainment of the advantages of that improved process.

The present invention also provides a unified apparatus for separating absorbed gasoline constituents from liquid absorbents which is compact, simple and sturdy. The improved apparatus of the invention is efficient in effecting such separation and also has important advantages in mobility. It is also comparatively inexpensive in construction and is easily repaired and cleaned.

I claim:

1. An apparatus for separating absorbed constituents from liquid absorbents comprising an exhausting tower, means for promoting gas and liquid contact and heat exchange in the tower arranged above the bottom thereof, a partition arranged in the lower part of the tower dividing it into a heated supply compartment and a discharge compartment opening upwardly into the tower, means for introducing charged liquid absorbent into the supply compartment, means for withdrawing liquid from the supply compartment and discharging the withdrawn liquid into the tower over the upper part of the contact promoting means, means for conducting liquid from the lower part of the contact promoting means to the discharge compartment, and connections for withdrawing vapors and gases from the upper end of the tower and for withdrawing liquid from the discharge compartment.

2. An apparatus for separating absorbed constituents from liquid absorbents comprising an exhausting tower, a series of baffles arranged in the tower above the bottom thereof, a partition arranged in the lower part of the tower below the baffles and dividing the lower part of the tower into a heated supply compartment and a discharge compartment opening upwardly into the tower, means for introducing charged liquid absorbent into the supply compartment, means for withdrawing liquid from the supply compartment and discharging the withdrawn liquid into the upper part of the tower over the baffles therein, means for conducting liquid from the lowermost baffle to the discharge compartment, and connections for withdrawing vapors and gases from the upper end of the tower and for withdrawing liquid from the discharge compartment.

3. An apparatus for separating absorbed constituents from liquid absorbents comprising an exhausting tower, means for promoting gas and liquid contact and heat exchange in the tower arranged above the bottom thereof, a vertically arranged partition in the lower part of the tower dividing it into a supply compartment and a discharge compartment opening upwardly into the tower, headers arranged on opposite sides of the lower part of the tower and below the upper edge of the partition, a plurality of heating tubes extending between the opposite headers without passing through the partition, means for introducing charged liquid absorbent into the supply compartment, means for withdrawing liquid from the supply compartment and discharging the withdrawn liquid into the tower over the upper part of the contact promoting means, means for conducting liquid from the lower part of the contact promoting means to the discharge compartment, and connections for withdrawing vapors and gases from the upper end of the tower and for withdrawing liquid from the discharge compartment.

4. An apparatus for separating absorbed constituents from liquid absorbents comprising an exhausting receptacle, a heated supply receptacle and a discharge receptacle having a common connection for conducting vapors and gases therefrom to one end of the exhausting receptacle, means for passing extraneous gas through the exhausting receptacle with the vapors and gases, means for introducing charged liquid absorbent into the supply receptacle, means for withdrawing liquid from the supply receptacle and discharging the withdrawn liquid into the other end of the exhausting receptacle, a connection for conducting liquid from the exhausting receptacle to the discharged receptacle, a connection for withdrawing vapors and gases from the exhausting receptacle and a connection for withdrawing liquid from the discharge receptacle.

5. An apparatus for separating absorbed constituents from liquid absorbents comprising an exhausting receptacle, a heated supply receptacle and a discharge receptacle having a common connection for conducting vapors and gases therefrom to one end of the exhausting receptacle, means for introducing charged liquid absorbent into the supply receptacle, means for introducing a gas into the supply receptacle, means for withdrawing liquid from the supply receptacle and discharging the withdrawn liquid into the other end of the exhausting receptacle, a connection for conducting liquid from the exhausting receptacle to the discharge receptacle, a connection for withdrawing vapors and gases from the exhausting receptacle and a connection for withdrawing liquid from the discharge receptacle.

6. An apparatus for separating absorbed constituents from liquid absorbents comprising an exhausting tower, means for promoting gas and liquid contact and heat exchange in the tower arranged above the bottom thereof, a heated supply compartment and a discharge compartment arranged in the lower part of the tower opening upwardly therein, means for introducing a gas into the lower part of the tower and passing it upwardly through the contact promoting means, means for introducing a charged liquid absorbent into the supply compartment, means for withdrawing liquid from the supply compartment and discharging the withdrawn liquid into the tower above the upper part of the contact promoting means, means for conducting liquid from the lower part of the contact promoting means to the discharge compartment, and connections for withdrawing vapors and gases from the upper part of the tower and for withdrawing liquid from the discharge compartment.

7. An apparatus for separating absorbed constituents from liquid absorbents comprising an exhausting receptacle, a heated supply receptacle and a discharge receptacle having a common connection for conducting vapors and gases therefrom to one end of the exhausting receptacle, a connection for introducing charged liquid absorbent into the supply receptacle, means for withdrawing liquid from the supply receptacle and discharging the withdrawn liquid into the other end of the exhausting receptacle, means for conducting liquid from the exhausting receptacle to the discharge receptacle, a connection for withdrawing the separated absorbed constituents from the exhausting receptacle and a connection for withdrawing liquid from the discharge receptacle.

8. An apparatus for separating absorbed constituents from liquid absorbents comprising an exhausting tower, means for promoting gas and liquid contact in the tower arranged above the bottom thereof, a heated supply compartment and a discharge compartment arranged in the lower part of the tower opening upwardly therein, a connection for introducing charged liquid absorbent into the supply compartment, means for withdrawing liquid from the supply compartment and discharging the withdrawn liquid into the tower over the upper part of the contact promoting means, means for conducting liquid from the lower part of the contact promoting means to the discharge compartment, and connections for withdrawing the separated constituents from the upper end of the tower and for withdrawing liquid from the discharge compartment.

In testimony whereof I affix my signature.

HAROLD B. BERNARD.